US006974283B2

(12) United States Patent
Oettle

(10) Patent No.: US 6,974,283 B2
(45) Date of Patent: Dec. 13, 2005

(54) CUTTING DEVICE

(75) Inventor: Matthias Oettle, Riederich (DE)

(73) Assignee: Hartmetall-Werkzeugfabrik Paul Horn GmbH, Tübingen (DE)

( * ) Notice: Subject to any disclaimer, the term of this patent is extended or adjusted under 35 U.S.C. 154(b) by 0 days.

(21) Appl. No.: 10/478,318

(22) PCT Filed: Jun. 18, 2002

(86) PCT No.: PCT/EP02/06688

§ 371 (c)(1),
(2), (4) Date: Nov. 20, 2003

(87) PCT Pub. No.: WO03/004203

PCT Pub. Date: Jan. 16, 2003

(65) Prior Publication Data

US 2004/0151551 A1 Aug. 5, 2004

(30) Foreign Application Priority Data

Jul. 5, 2001 (DE) ........................................ 101 32 721

(51) Int. Cl.[7] ................................................ B23B 29/00
(52) U.S. Cl. ........................................ 407/107; 407/110
(58) Field of Search ......................... 407/107, 108–112, 407/66, 117, 113

(56) References Cited

U.S. PATENT DOCUMENTS

| | | | | |
|---|---|---|---|---|
| 4,580,930 A | | 4/1986 | Zinner | |
| 4,938,641 A | * | 7/1990 | Maier | 407/110 |
| 5,139,371 A | | 8/1992 | Kraft et al. | |
| 5,267,817 A | | 12/1993 | England | |
| 5,921,724 A | * | 7/1999 | Erickson et al. | 407/117 |
| 6,050,751 A | | 4/2000 | Hellstrom | |
| 6,186,704 B1 | * | 2/2001 | Hale | 407/101 |
| 6,241,429 B1 | | 6/2001 | Schafer et al. | |
| 6,261,032 B1 | * | 7/2001 | Duwe et al. | 407/110 |
| 6,758,637 B2 | * | 7/2004 | Gati | 407/92 |

FOREIGN PATENT DOCUMENTS

| | | |
|---|---|---|
| DE | 26 53 222 | 6/1977 |
| DE | 198 47 227 | 4/2000 |
| EP | 1 226 890 | 7/2002 |

* cited by examiner

*Primary Examiner*—Willmon Fridie, Jr.
(74) *Attorney, Agent, or Firm*—Roylance, Abrams, Berdo & Goodman, L.L.P.

(57) ABSTRACT

A cutting device includes a holder (10) provided with a jaw-like opening (24) on a clamping head (20) that serves to accommodate a metal-cutting tool (22). The jaw-like opening (24) is located on a longitudinal side (16) of the clamping head (20). A face (28) of the clamping head extends transverse to the longitudinal side (16), and faces a workpiece (30) that rotates during metal-cutting machining. The face (28) is provided, at least in the area in which it leads into the opening (24), with a camber (32) whose curvature corresponds to the curvature of a workpiece (30) having the largest diameter intended to be used with the cutting device.

10 Claims, 3 Drawing Sheets

CUTTING DEVICE

FIELD OF THE INVENTION

The present invention relates to a cutting device with a holder provided on a clamping head for holding a metal-cutting tool. The clamping head has a jaw-like receptacle located on one longitudinal side of a clamping head, and a front face extending transversely to its longitudinal side facing the workpiece which rotates during metal-cutting machining.

BACKGROUND OF THE INVENTION

Cutting devices (such as disclosed in U.S. Pat. No. 5,267,817 and in WO 99/50,012) are obtainable in a plurality of conventional embodiments and are freely available on the market. The conventional approaches are used especially for end-cut turning and plain turning, and for cut-off operations on a rotating workpiece made generally rotationally symmetrical as a turned part. These known cutting devices have an elongated holder with a square cross section which can be fixed over the area of its one free end on a tool holder. Several cutting devices can be held in a holder device, often under constricted installation conditions. The cutting devices can be located horizontally in a row on top of one another in the overall holder device, but also directly next to one another. On its other end, the holder undergoes transition in one piece into a block-like clamping head which holds the metal-cutting tool on its side by way of a receptacle. This block-like clamping head has essentially planar surfaces to all sides which transition into one another at a right angle. In particular the front face of the clamping head is made in the form of a straight plane extending at a right angle to the bottom and top and the longitudinal sides of the holder. The metal-cutting tool with its machining cutting edge projects from this flat plane forward in the direction of the machining zone. With respect to the indicated geometrical structure of the clamping head, the cutting edge of the machining tool on the rotating workpiece must first create a clear space so that for deeper machining the clamping head can follow over its entire width. In particular, in a constricted installation situation for the cutting device and for cramped machining areas on the rotating workpiece into which, for example, only a thin machining groove is to be made, the known approaches are unsuitable. In these instances the rotating workpiece would then collide with the front face of the clamping head.

SUMMARY OF THE INVENTION

Objects of the present invention are to provide a cutting device that can be easily used even under constricted installation conditions and that can cut even narrow geometries into the workpiece at a definable depth without collisions between the machining tool and the workpiece.

In the cutting device of the present invention, the front face is provided, at least in the area where it leads into the receptacle, with a camber. The camber has a curvature corresponding to the curvature of the workpiece, with the largest diameter for which the cutting device is intended as a machining tool. The front face of the clamping head is cambered at least in parts, and recedes relative to the workpiece to be machined. The machining tool conversely projects distinctly in the manner of a retaining rib held in the direction of the machining tool. Depending only on the width of the cutting edge which can be engaged, a geometry can be defined in the rotating tool, for example, in the form of a recessed groove extending narrowly, especially in cross section or the like. The cambered front face forms a space in which the rotating workpiece can move. Basically, the clamping head, during machining, holds parts of the tool, and in this way makes it possible for the machining tool to have a high penetration depth without, as in the known approaches, the clamping head first having to follow in the space of the rotating tool which is to be machined clear.

In one preferred embodiment of the cutting device of the present invention, the receptacle is part of the retaining rib which projects as an integral component of the clamping head from the latter. The camber of the front face extends from the area of the receptacle to the bottom of the clamping head. As a result of this retaining rib, a stiffened overall structure is still obtained in the area of the clamping head. The forces that occur during machining can be diverted reliably from the cutting edge of the machining tool by way of the machining tool into the retaining rib, and thus, into the remaining clamping head.

In another preferred embodiment of the cutting device of the present invention, the camber of the front face on the top of the clamping head undergoes a transition into an obliquely extending flattened area. The flattened area is penetrated by a setscrew that changes the clear cross section of the clamping gap passing at least through the clamping head and leading into the receptacle. If there are several holders on the cutting device in a central holder receptacle of a machine tool or the like directly in a horizontal plane next to one another, it is possible to replace a machine tool when it is worn by a new one by way of the setscrew. The setscrew is accessible from overhead without including the remaining holder configuration in the replacement process. Thus, the replacement process can be undertaken quickly and with precision, entailing low installation effort. This replacement process greatly reduces downtimes.

In another preferred embodiment of the cutting device of the present invention, the clamping gap in the area of its longitudinal side facing away from the receptacle is penetrated, at least partially, by a bearing block site. The bearing block site ensures that the clamping process for the machining tool is not undertaken on one side. This undertaking could possibly lead to tilting, which would ultimately adversely affect the machining precision. Rather, the bearing block site ensures that the clamping gap is uniformly reduced, so that in the fixing process of the tool on the retaining rib no tilting can occur.

In another preferred embodiment of the cutting device of the present invention, the cambered front face on the bottom of the clamping head undergoes a transition into a support surface which extends obliquely to the feed direction of the tool from the receptacle in the direction of the clamping head. The material use for the clamping head is further reduced by the oblique support surface. Yet, the overall construction of the clamping head is stiffened by the support surface, such that machining precision is not adversely affected. Since, as a result of the support surface, material in the area of the front face of the clamping head can be saved, additional space is consequently created in the area of the clamping head which can be used by the rotating workpiece in machining without the danger of collisions.

In one especially preferred embodiment of the cutting device of the present invention, the distance between the cambered front face of the clamping head and the machining cutting edge of the metal-cutting tool is slightly larger than the largest possible diameter of the rotating workpiece which is designed for machining with this tool. Thus, it is possible to carry out a cut-off process on a workpiece along a groove path with a narrow structure without collisions occurring. A larger clear space on the workpiece need no longer be formed first by way of the tool, as was necessary in the prior art, in order to then be able to undertake the cut-off process in several steps. Rather, the cut-off process is possible with a feed motion.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
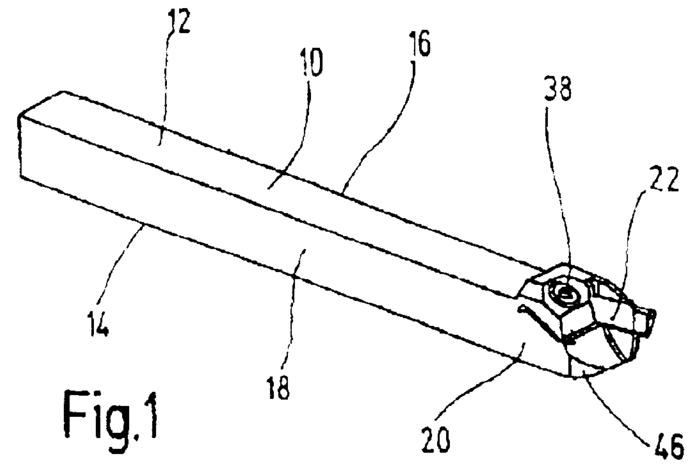
FIG. 1 is a perspective view of a cutting device according to a first embodiment of the present invention.

As shown in FIG. 1, the cutting device has a holder 10 with an essentially square transverse cross section. Viewed in the line of sight to FIG. 1, the holder 10 has a top 12, a bottom 14, and viewed in the machining direction a left longitudinal side 16 and a right longitudinal side 18. The shaft part of the holder 10 is made relatively long to form a large contact surface for the holder receptacle (not shown) of a machine tool such as a lathe (not shown) or the like. On its front end, the holder 10 is provided with a clamping head 20. The block-like clamping head 20 undergoes transitions with its side surfaces, except for its front face flush into the side surfaces of the holder 10, and projects only in the area of the top of the holder 10 with a definable projection. For holding a metal-cutting tool 22, the clamping head 20 is provided with a jaw-like receptacle 24. In the embodiment shown, receptacle 24 is located on the left longitudinal side 16 of the clamping head 20. The metal-cutting tool 22 forms essentially a hard metal cutting tool with two diametrically opposite machining cutting edges 26. In the drawings, only the machining cutting edge 26 intended for machining is shown. The tool can be released when worn by opening the jaw-like receptacle 24 of the metal cutting tool 22. After turning the metal-cutting tool 22 by 180° around its transverse axis, the new machining cutting edge 26 can then be engaged to the workpiece by the metal-cutting tool 22 then being fixed by the clamp receptacle 24, again on the clamping head 20 of the holder 10 in another step. Pertinent replacement is conventional so that it will not be described in detail.

Figure 3:
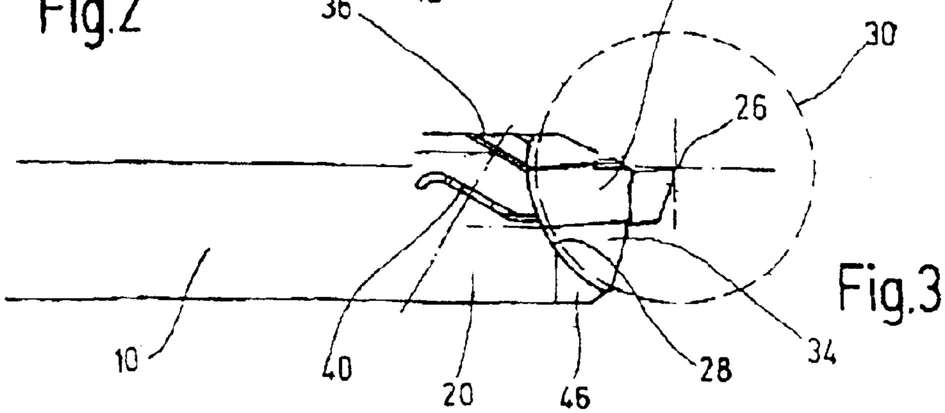
FIG. 3 is a side elevational view of the cutting device of FIG. 1.

Transversely to the longitudinal sides 16 and 18 of the holder 10, the clamping head 20 has a front face 28 facing a rotating workpiece 30 (turned part) in a metal-cutting machining process. The workpiece 30, shown in FIG. 3, is to be machined with the cutting device, for example it is to be exposed from the outside to a cut-off turning or a plain turning process. Furthermore, it should be possible to carry out a cut-off process with the cutting device, in which the machining cutting edge 26, as shown in FIG. 3, penetrates as far as the longitudinal axis or the center of rotation of the workpiece 30 in order to cut parts of the workpiece off the workpiece 30 which remains in the chuck or the like on the machine. For the following description, the workpiece 30 should have a machining diameter of a maximum of 20 mm. Depending on how the machining geometries are chosen here, the cutting device with its geometrical dimensions can then be matched according to the machining situation. As is to be understood from FIG. 3, in the machining situation shown, the machining cutting edge 26 has reached the middle of the workpiece 30. The bottom 14 of the holder 10 extends as far as the effective edge of the machining cutting edge 26 over the radius of the turned part or the workpiece 30. This corresponds to the engagement height of half of the machining diameter, i.e., 10 mm.

Figure 2:
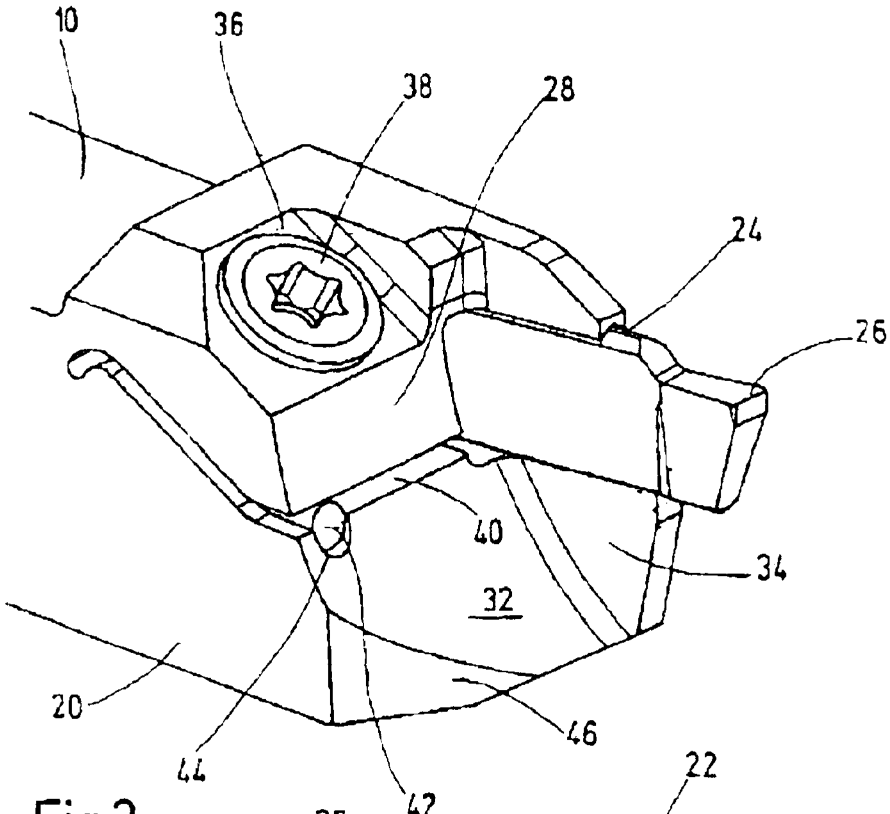
FIG. 2 is an enlarged partial perspective view of the cutting device of FIG. 1.

As is apparent from FIGS. 1 to 3, and especially from FIG. 2, the front face 28, at least in the area in which it is undergoes a transition into the receptacle 24, is provided with a camber 32. The camber curvature corresponds to the curvature of the workpiece 30, with the largest diameter, here 20 mm, for which the cutting device is intended as a metal-cutting tool 22.

The receptacle 24 is part of a retaining-rib 34 of the clamping head 20. The retaining rib 34 in an extension of the left side 16 of the holder 10, and consequently is an integral component of the clamping head 20. Furthermore, the camber 32 of the front face 28 on the top 12 of the clamping head 20 undergoes a transition into an obliquely running flattened area 36 in the manner of a side surface which is penetrated by a setscrew 38. Setscrew 38 changes the clear cross section of the clamping gap 40 which penetrates at least the clamping head 20 and which ends in a bent curve with its one side in the area of the holder 10 and with its other area communicating to the exterior, on the cambered front face 28. When the setscrew 38 is loosened, the clamping gap 40 is cleared. Due to the inherent elasticity of the material parts of the clamping head 20, the jaw-like receptacle 24 gapes somewhat apart and releases the metal-cutting tool 22 for replacement. In this way the metal-cutting tool 22 can be fixed again in the jaw-like clamp receptacle 24 in the reverse sequence.

As can be interpreted from FIG. 3, the distance between the cambered front face 28 of the clamping head 20 and the machining cutting edge 26 of the metal-cutting tool 22 is slightly larger than the largest possible diameter (20 mm) of the rotating workpiece 30 which is intended for machining with this metal-cutting tool 22. Thus, in the clamping head 20, a clear space is formed in which the rotating workpiece parts 30 can enter without a collision occurring between the clamping head 20 of the holder 10 and the workpiece 30 in machining with the metal-cutting tool 22. In this way, great machining depths on the workpiece 30 can be attained, as can groove geometries with an exceptionally narrow structure, without space having to be formed first for this on the workpiece 30 by metal cutting for penetration of the clamping head 20 with the metal cutting tool 22.

As illustrated in FIG. 2, the clamping gap 40, in the area of its longitudinal side (right side 18) spaced from the receptacle 24, is penetrated at least partially by a bearing block site 42. Bearing block site 42 fits like a pin into a recess 44 in the clamping head 20. If the setscrew 38 is tightened for a fixing process, the upper wall of the clamping gap 40 can accordingly be supported on the bearing block site 42 and the clamping process takes place over the entire width of the metal-cutting tool 22 by the retaining rib 34. Tilting cannot occur, which tilting could adversely affect machining precision. The clamping gap 40 which projects over the clamping head 20 in the direction of the holder 10 and into the holder to provide additional support.

The cambered front face 28, on the bottom 14 of the clamping head 20, undergoes a transition into a support surface 46 extending obliquely to the feed direction of the metal-cutting; tool 22 from the receptacle 24 in the direction of the clamping head 20. The support surface 46 in turn saves material on the clamping head 20. This saving reduces the danger of collisions with the workpiece 30 to be machined: In spite of the material saved, the retaining rib 34 is stiffened by the support surface 46 and the cambered front face 28. In spite of the low material use for the clamping head 20, the metal-cutting machine tool 22 is still reliably fixed in its holder 24, allowing the cutting device to be used for high-precision machining processes.

Alternative to the arrangement in FIGS. 1 to 3, the retaining rib 34 with the metal-cutting machine tool 22 can also be located on the opposite side, i.e., on the right side 18 in the machining direction. Alternatively, several holders 10 (not shown) with metal-cutting tools 22 can be located in the horizontal plane next to one another. Two cutting devices located adjacent to one another can also have the metal-cutting tools 22 with one on the left side and one on the right side. It is also possible in a vertical plane to move several of the cutting devices on top of one another in the machining configuration if the machining processes should dictate this.

The following embodiments are described only to the extent that they differ significantly from the preceding embodiment. The same reference numerals are used for identical parts. The previous statements in this respect also applying accordingly to the other embodiments.

Figure 4:
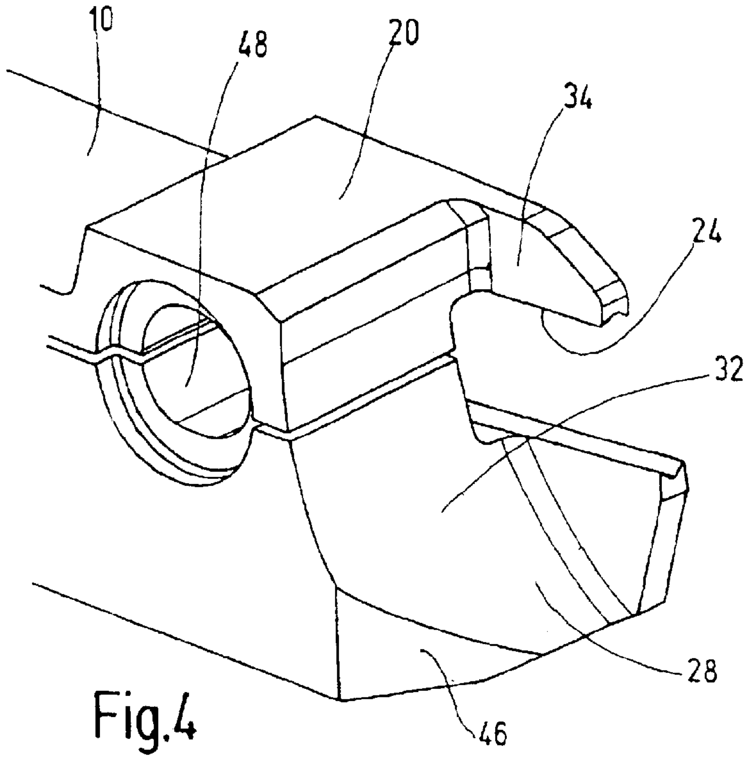
FIG. 4 is a partial perspective view of a cutting device according to a second embodiment of the present invention.
Figure 5:
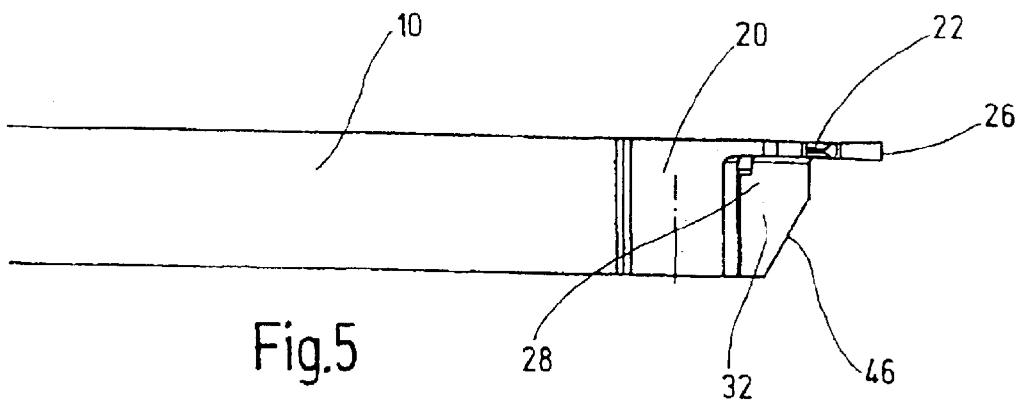
FIG. 5 is a top plan view of the cutting device of FIG. 4.
Figure 6:
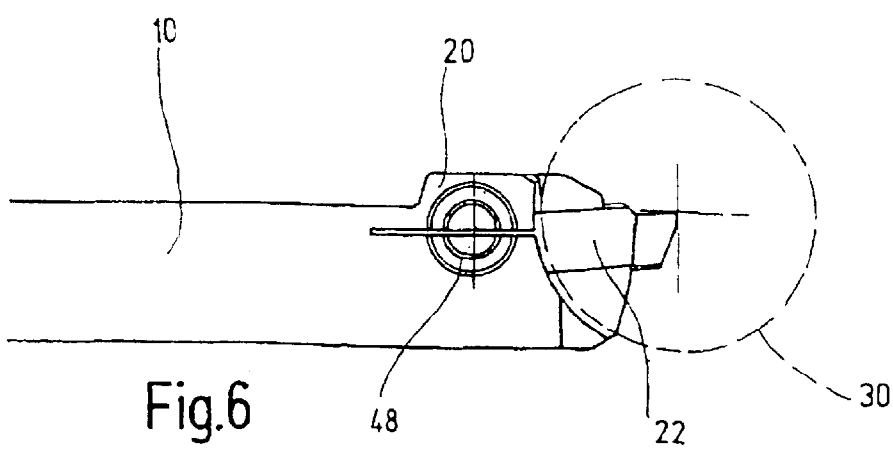
FIG. 6 is a side elevational view of the cutting device of FIG. 4.

The second embodiment, shown in FIGS. 4, 5, and 6, differs from the first embodiment in that the front face 28 with its camber 32 now extends over the entire height of the clamping head 20. In the second embodiment of the cutting device the clamping gap 40 is penetrated by an actuation opening 48 which can be spread by an actuating key (not shown) with a polygonal actuation cross section. Spreading opening 48 enlarges the clamping gap 40 and widens the receptacle 24, such that the metal-cutting tool 22 is released for a replacement process. With the continued turning of the polygonal key, the actuation opening 48 in turn closes. The clamping gap 40 is then narrowed along with the receptacle 24 for the metal-cutting tool 22 (omitted in FIG. 4). The camber 32 in the clamping head 20 also recedes such that the workpiece 30 with its maximum machining diameter can fit into the released parts of the clamping head 20. Furthermore, the camber 32 and accordingly the retaining rib 34 are stiffened by the obliquely running support surface 46 (compare FIG. 5).

Figure 7:
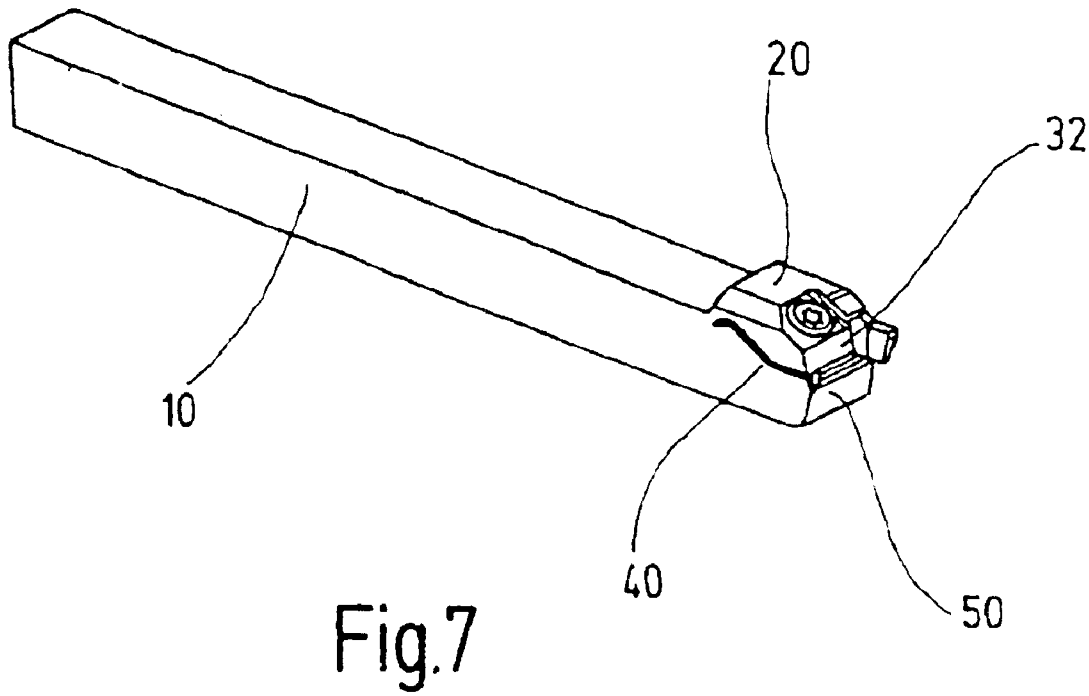
FIG. 7 is a perspective view of a cutting device according to a third embodiment of the present invention.
Figure 8:
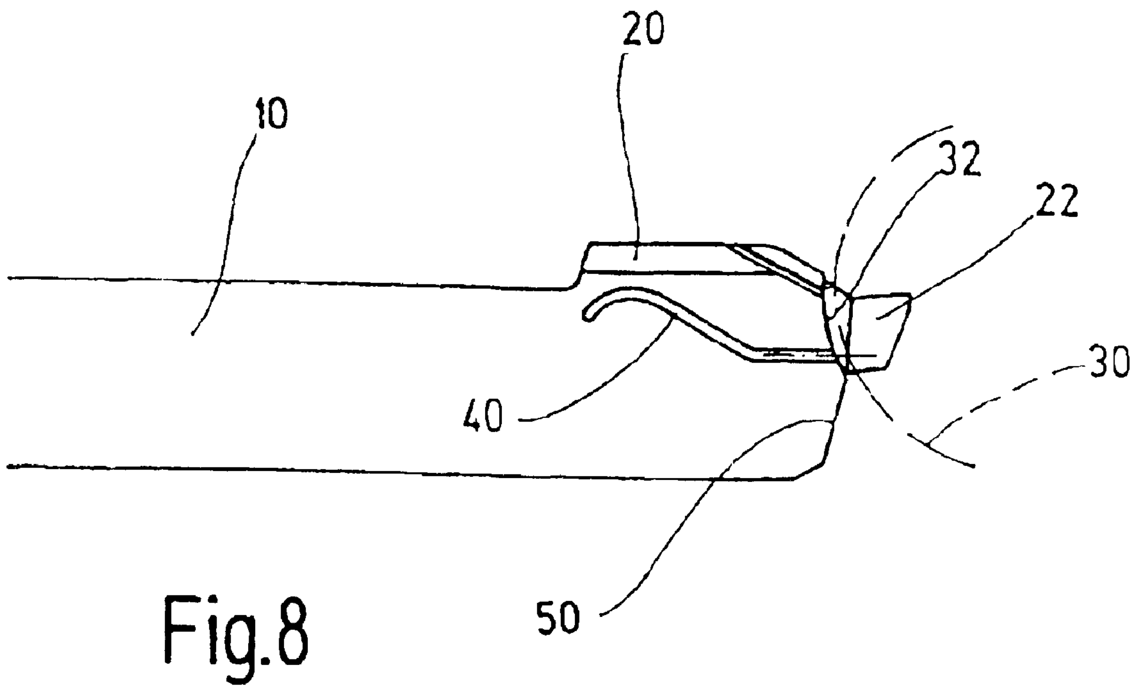
FIG. 8 is a side elevational view of the cutting device of FIG. 7.

In the third embodiment, as shown in FIGS. 6 and 7, the camber 32 of the front face 28 is present only in the area of the height of the receptacle 24. Otherwise, the front face 28, as shown especially by FIG. 7, is provided with a run-off bevel 50 which extends back towards the bottom 14. The run-off bevel 50 likewise ensures that unintended collisions between the cutting device and the workpiece 30 cannot occur. Since the camber 32 is designed with its curvature only partially through the front face 28, it is not possible with the machining cutting edge 26, as in the above described approaches, to advance as far as the middle of the workpiece 30, i.e., up to its axis of rotation. The third embodiment is therefore intended for special machining situations, in which a cut-off process is not absolutely specified, for example. This can, without colliding with the workpiece 30, penetrate far into the workpiece 30 with the metal-cutting tool 22 for producing a narrow machining groove.

To prevent collisions, the distance between the cambered front face 28 of the clamping head 20 and the machining cutting edge 26 of the metal-cutting tool 22 can be slightly larger than the largest possible diameter of the rotating workpiece 30 which is intended for machining with this metal-cutting tool 22. With the cutting device of the present invention, high-precision machining can be done and great penetration depths can be implemented on the workpiece without first having to form corresponding clear spaces in the workpiece 30 by cutting, as in the prior art, so that the clamping head 20 can follow the machining direction of the metal-cutting tool 22 into the workpiece 30.

While various embodiments have been chosen to illustrate the invention, it will be understood by those skilled in the art that various changes and modifications can be made therein without departing from the scope of the invention as defined in the appended claims.

What is claimed is:

1. A cutting device, comprising:

a holder;

a clamping head located on said holder and having a top surface;

a jaw-like receptacle located on a first longitudinal side of said clamping head;

a front face on said clamping head extending transversely to said first longitudinal side and facing a rotating workpiece to be machined, said front face having a camber at least in an area leading into said receptacle and an obliquely extending flattened area extending between said camber and said top surface, said camber having a face curvature corresponding to a workpiece curvature with a largest diameter of a workpiece intended to be used therewith;

a metal-cutting tool received in said receptacle;

a clamping gap extending at least through said clamping head and into said receptacle, and having a clear cross section; and a set screw penetrating said flattened area and varying dimensions of said clear cross section.

2. A cutting device according to claim 1 wherein said receptacle is part of a retaining rib projecting from and being an integral portion of said clamping head; and said camber extends from an area of said receptacle to a bottom of said clamping head.

3. A cutting device according to claim 1 wherein said camber extends substantially over an entire height of said clamping head with said face curvature.

4. A cutting device according to claim 1 wherein said metal-cutting tool comprises a cutting edge on an end thereof remote from said clamping head; and said cutting edge is spaced from said camber by a distance slightly greater than the largest diameter of the workpiece intended to be used therewith.

5. A cutting device according to claim 4 wherein said clamping gap extends outward from said clamping head into a portion of said holder.

6. A cutting device according to claim 3 wherein said clamping gap extends outward from said clamping head into a portion of said holder.

7. A cutting device according to claim 1 wherein a bearing block site at least partially penetrates said clamping gap adjacent a second longitudinal side opposite said first longitudinal side.

8. A cutting device according to claim 1 wherein a support surface extends between said camber and a bottom of said clamping head, and extends obliquely relative to a feed direction of said metal-cutting tool from said receptacle in a direction of said clamping head.

9. A cutting device according to claim 1 wherein said metal-cutting tool comprises first and second cutting edges on diametrically opposite ends thereof.

10. A cutting device according to claim 1 wherein said metal-cutting tool is selectively fixed on said first longitudinal side.

* * * * *